UNITED STATES PATENT OFFICE.

ERNST KNOLL, OF MEININGEN, GERMANY, ASSIGNOR TO THE FIRM OF METALL- UND ISOLIER-WERKE G. M. B. H. MEININGEN, OF MEININGEN, GERMANY.

PROCESS OF MANUFACTURING A SUBSTITUTE FOR VULCANITE.

1,088,907.   Specification of Letters Patent.   Patented Mar. 3, 1914.

No Drawing.   Application filed October 14, 1912.   Serial No. 725,730.

*To all whom it may concern:*

Be it known that I, ERNST KNOLL, a citizen of the German Empire, and residing at Meiningen, Germany, have invented a certain new and useful Improved Process of Manufacturing a Substitute for Vulcanite, of which the following is a specification.

My invention relates to a process of making a substitute for vulcanite, which is not only equal to the natural product both as an electrical insulator, and in mechanical strength, in capability of being worked, and in resistance to hot oil, but is also much cheaper to manufacture.

No practical, useful product has heretofore resulted from the various processes proposed for the production of a vulcanite substitute. Moreover, nothing practical has resulted from attempts to substitute the cheaper materials, such as vegetable juices, guayule caoutchouc, creeps and so on, or by artificial products, such as the various known oil-caoutchoucs in place of the more expensive raw rubber, owing to the poor mechanical, chemical and electrical qualities of such materials, even when additional substances, such as old rubber in the form of powder, or loading materials, such as heavy spar, chalk and so on, are employed.

The process of making a substitute for vulcanite by mixing minerals and fibrous substances with lac, asphalt and the like, results in a product which cannot be satisfactorily worked.

A primary object of my invention is to provide an improved process of making a cheap vulcanite substitute made from natural rubber, which possesses all the properties of the natural product, and in some respects even superior properties.

In contradistinction to known processes, I do not start with regenerated rubber as the admixture or chief ingredient of a mixture composed of a number of cheap substances serving simply as loading materials, such as powdered leather, slate or coke or the like, but I use the regenerated rubber simply as a binder; I first mix a small quantity of softened, gelatinous old rubber with an admixture of sulfur and oil, with powdered slate, leather, vulcanite and the like, and I then vulcanize this mixture. After the homogeneous and dense mass thus obtained has been ground to a fine powder it serves as the starting material for the cheap loading materials which are to form the principal components of the substitute, such as small quantities of guayule, and oils, waxes, fats and the like of the lowest quality, e. g. oil residua, ceresin residues, sulfur.

The process according to my invention may be carried into practice, for example, as follows:—

1. Ground rubber refuse is boiled with a suitable oil, e. g. linseed oil, until a gelatinous mass is obtained. If the lowest grades of oil, such as still bottoms, are added, no practical disadvantages will arise.

2. This mass is then mixed with known loading materials, such as powdered slate, leather and the like, with an admixture of inexpensive oils, e. g. refuse oil, and with sulfur, the relative proportions of the constituents being chosen to suit the purpose of employment of the final product. This mixture is then vulcanized and ground. The powder thus obtained serves as the foundation material for the desired vulcanite substitute, and not only can any desired coloration of the final product be now arranged for by adding to this powder suitable coloring substances, but a predetermined hardness of the final product best suited to its purposes of employment can be obtained by varying the proportions of the various substances from which this final product is made.

3. After this foundation material, which serves as binding agent, has been made in the manner described above, the same is mixed with a small quantity of a caoutchouc substitute, such as guayule, creeps, balata, regenerated balata and the like, and with a small admixture of oil, wax, resin and the like, the quantity of this admixture depending on the desired quality of the final product; some more sulfur is added and the mixture is then vulcanized.

Even when the admixtures added to the foundation material are substances of the kind described, i. e., substances of essentially the smallest possible value, the product thus obtained possesses all the properties of vulcanite made from natural rubber, and is even superior to the same with respect to its resistance to the action of heat, acids and hot oil, and especially with respect to its capability of being worked.

The percentage of old rubber contained in the artificial product made according to my invention is so small, *i. e.* about 1 to 2% by weight, that it acts only as a binding agent, but, owing to the manner in which the process is carried out, is so uniformly distributed that a final product is obtained which is absolutely homogeneous and has the same excellent qualities throughout its structure. In contradistinction to known processes, owing to this small percentage it is possible to so exactly prearrange the complete mixture as to all its components that a practically absolutely uniform product, regulatable with respect to its constituents, is obtained. In no known process is this possible because the constituents of old material are always variable and unknown and, consequently, when a large quantity of such material is employed, a large percentage of the mixture is not under the control of the manufacturer.

I claim:—

1. A process of producing a substitute for vulcanite consisting in boiling ground rubber refuse with oil until a gelatinous mass is obtained, in mixing the said mass with a loading material, oil and sulfur, in vulcanizing the mixture thus obtained, in pulverizing the vulcanized product, in mixing the powder thus obtained with a caoutchouc substitute, oil and sulfur, and in vulcanizing the mixture thus obtained the amounts of the several ingredients being so proportioned that the amount of said rubber is not materially above 2% of the entire mass.

2. A process of producing a substitute for vulcanite consisting in boiling ground rubber refuse with oil until a gelatinous mass is obtained, in mixing the said mass with powdered slate, oil and sulfur, in vulcanizing the mixture thus obtained, in pulverizing the vulcanized product, in mixing the powder thus obtained with a caoutchouc substitute, oil and sulfur, and in vulcanizing the mixture thus obtained the amounts of the several ingredients being so proportioned that the amount of said rubber is not materially above 2% of the entire mass.

3. A process of producing a substitute for vulcanite consisting in boiling ground rubber refuse with oil until a gelatinous mass is obtained, in mixing the said mass with a loading material, oil and sulfur, in vulcanizing the mixture thus obtained, in pulverizing the vulcanized product, in mixing the powder thus obtained with guayule, oil and sulfur, and in vulcanizing the mixture thus obtained the amounts of the several ingredients being so proportioned that the amount of said rubber is not materially above 2% of the entire mass.

4. A process of producing a substitute for vulcanite consisting in pulverizing a vulcanized mixture of gelatinous regenerated rubber, powdered slate, refuse oil and sulfur, and in vulcanizing a mixture of the powder thus obtained with a caoutchouc substitute, a pigment, oil, wax, resin, and sulfur the amounts of the several ingredients being so proportioned that the amount of said rubber is not materially above 2% of the entire mass.

In testimony whereof, I affix my signature in the presence of two witnesses.

ERNST KNOLL.

Witnesses:
ERNEST H. L. MUMMENHOFF,
FRANCIS R. STEWART.